United States Patent
Drapala et al.

(10) Patent No.: US 7,574,548 B2
(45) Date of Patent: Aug. 11, 2009

(54) DYNAMIC DATA TRANSFER CONTROL METHOD AND APPARATUS FOR SHARED SMP COMPUTER SYSTEMS

(75) Inventors: Garrett M. Drapala, Poughkeepsie, NY (US); Deanna P. Dunn, Poughkeepsie, NY (US); Michael Fee, Cold Spring, NY (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 11/853,881

(22) Filed: Sep. 12, 2007

(65) Prior Publication Data

US 2009/0070498 A1 Mar. 12, 2009

(51) Int. Cl.
*G06F 13/14* (2006.01)
*G06F 13/42* (2006.01)

(52) U.S. Cl. .................. 710/305; 710/105; 711/157; 711/167

(58) Field of Classification Search ......... 710/305–316, 710/105; 711/157, 167
See application file for complete search history.

(56) References Cited

U.S. PATENT DOCUMENTS

| 6,389,501 | B1 * | 5/2002 | Garney et al. | 710/310 |
|---|---|---|---|---|
| 6,425,041 | B1 * | 7/2002 | Klein | 710/306 |
| 6,546,018 | B1 * | 4/2003 | Garney et al. | 370/428 |
| 6,546,507 | B1 * | 4/2003 | Coyle et al. | 714/43 |
| 6,629,186 | B1 * | 9/2003 | Garney et al. | 710/310 |
| 6,889,265 | B2 * | 5/2005 | Garney et al. | 710/18 |
| 2001/0034801 | A1 * | 10/2001 | Koyama | 710/5 |
| 2002/0157032 | A1 * | 10/2002 | Jensen et al. | 713/500 |
| 2003/0093588 | A1 * | 5/2003 | Garney et al. | 710/6 |
| 2008/0005455 | A1 * | 1/2008 | Macri et al. | 711/105 |

* cited by examiner

*Primary Examiner*—Christopher B Shin
(74) *Attorney, Agent, or Firm*—Lynn L. Augspurger; Dan E. McConnell

(57) ABSTRACT

As a performance critical (high or full speed) request for a computer system data bus travels down a central pipeline, the system detects whether the interface data bus is currently empty or there is an ongoing half-speed transfer. If there is an ongoing low speed transfer, the system dynamically time shift or slows down the read rate out of the interleave buffer to half speed, and utilizes the free half of the bandwidth. This dynamic "zippering" or time shifting of data prevents a pipe pass from being rejected because the whole data bus is unavailable.

20 Claims, 4 Drawing Sheets

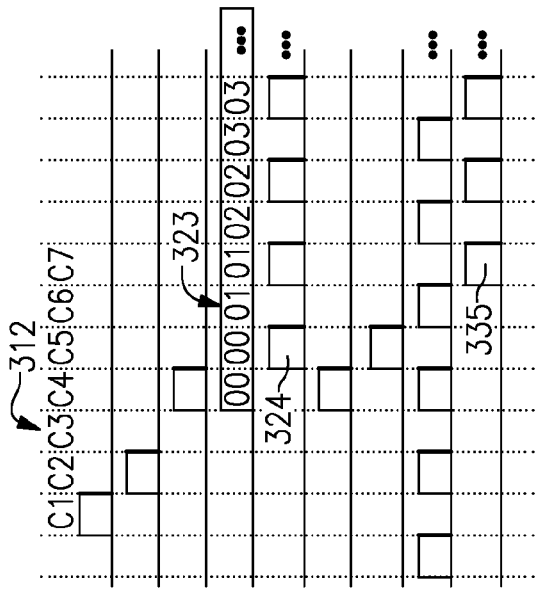

FIG.3

301: SC PIPELINE CYCLE
302: INTERFACE REQUEST B LAUNCHED FROM PIPELINE
311: INTERFACE ARBITRATION CYCLE
313: "ZIPPER" SIGNAL SENT TO DATAFLOW CONTROLS
321: BUFFER READ ADDRESS
322: BUFFER OUTGATE MULTIPLEXER SELECT
331: RESPONSE BEAT 1 ON INTERFACE (TRANSFER B)
332: RESPONSE BEAT 2 ON INTERFACE (TRANSFER B)
333: EXISTING DATA ON INTERFACE (TRANSFER A)
334: NEW DATA ON INTERFACE (TRANSFER B)

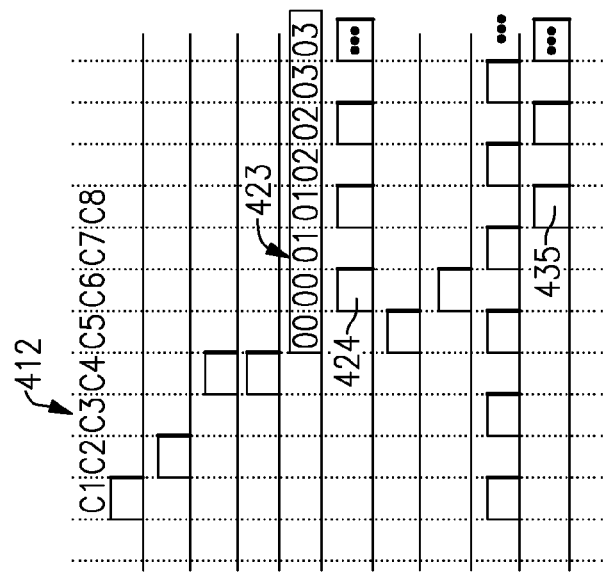

FIG.4

401: SC PIPELINE CYCLE
402: INTERFACE REQUEST B LAUNCHED FROM PIPELINE
411: INTERFACE ARBITRATION CYCLE
413: "ZIPPER" SIGNAL SENT TO DATAFLOW CONTROLS
414: "SKEW" SIGNAL SENT TO DATAFLOW CONTROLS
421: BUFFER READ ADDRESS
422: BUFFER OUTGATE MULTIPLEXER SELECT
431: RESPONSE BEAT 1 ON INTERFACE (TRANSFER B)
432: RESPONSE BEAT 2 ON INTERFACE (TRANSFER B)
433: EXISTING DATA ON INTERFACE (TRANSFER A)
434: NEW DATA ON INTERFACE (TRANSFER B)

DYNAMIC DATA TRANSFER CONTROL METHOD AND APPARATUS FOR SHARED SMP COMPUTER SYSTEMS

FIELD AND BACKGROUND OF INVENTION

This invention relates to computer system design and particularly to data transfers through a shared chip to chip interface.

Heretofore, allocating usage for a shared interface that sends data between two chips at two different speeds depending on the type of transfer resulted in all transfers taking place at a slower rate of speed. This solution is for scenarios where an interface is shared by several different requesters, some which transfer data at one data shot every clock cycle (full or high speed), and some which transfer data at one data shot every other cycle (half or low speed). Requests that are designed to transfer data at full speed are more critical to system performance than requests that are designed to transfer data at half speed.

A simple solution is to block a high speed transfer request when an ongoing low speed transfer is going on. However, this would result in a solution that has performance critical requests stuck behind less critical half speed transfers that last twice as long and only use half the available bus bandwidth. This is a severe performance degradation.

SUMMARY OF THE INVENTION

The shortcomings of such prior arrangements are overcome and additional advantages are provided through the utilization of the extra half of bus bandwidth for performance critical data transfers. Performance critical data transfers are transfers from the cache interleaves to the chip interface. Access to the interface is serialized via a central pipeline. As a performance critical (high or full speed request for the data bus travels down the central pipeline, the system detects whether the interface data bus is currently empty or there is an ongoing half-speed transfer. If there is an ongoing low speed transfer, the system will dynamically slow down the read rate out of the interleave buffer to half speed, and utilize the free half of the bandwidth. This dynamic "zippering" or time shifting of data prevents a pipe pass from being rejected because the whole data bus is unavailable.

Additionally, a new interface request that arrives during an ongoing half speed transfer can be skewed by one cycle to line up with the unused bus cycles. This prevents the request that arrives in the 'busy' cycle from being rejected and having to retry its pipe pass.

BRIEF DESCRIPTION OF DRAWINGS

Some of the puts of the invention having been stated, others will appear as the description proceeds, when taken in connection with the accompanying drawings, in which:

FIG. 3 illustrates an example of the timing relationship between an ongoing half-speed transfer and a new transfer that was dynamically slowed to half speed;

FIG. 4 illustrates an example of the timing relationship between an ongoing half-speed transfer and a new transfer that was dynamically slowed to half speed and skewed by one cycle to line up with the free half of the data bus bandwidth.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
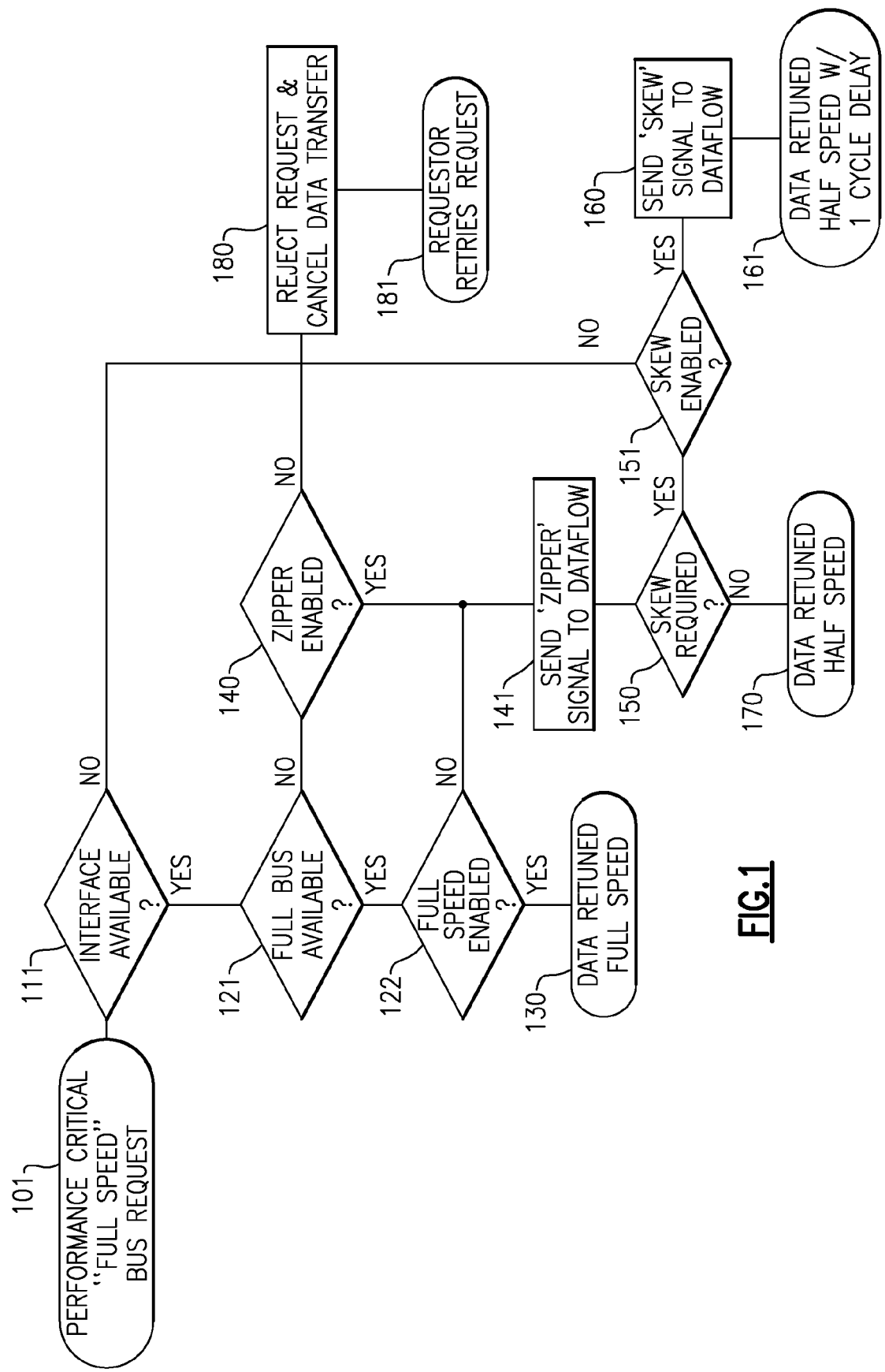
FIG. 1 illustrates a flowchart of the interface response and data bus allocation process.

Turning now to the drawings in greater detail, it will be seen in FIG. 1 that the dynamic data rate change takes place via a series of decisions, the results of which trigger certain signals to be sent to the dataflow buffers. Control flow 100 represents the decision tree made by the interface response and data bus arbiter and model, the embodiment of which enables the basic usage of the interface buses as well as the dynamic data return speed reduction described herein. Control flow 100 starts with the initiation of a performance critical request 101 for the usage of both the response bus and data bus portion of the chip to chip interface. A decision 111 is first made by the bus arbiter to determine if the response bus and data bus are available to send a new response over the interface. Most interface responses busy the response bus for two cycles, so the response portion of the bus is not always available. The bus arbiter reports the data bus available as long as its bandwidth is not being fully utilized. If the response bus is unavailable or the data bus is entirely busy, the request does not win access to the interface. As a result the request is rejected and the data transfer is cancelled as indicated at 180. The request 101 will not gain access to the interface at this time. The request for the interface must then be retried as indicated at 181. However, if the response bus is available and at least half the bandwidth on the data bus is available, the request 101 is guaranteed access to the response bus and at least half of the data bus. At this stage it is known that the request 101 will have access to the interface and will be returning its response and data. This therefore concludes the portion of the flow that handles decisions for access to the bus itself.

The remaining portion of the flowchart handles the decisions required to determine whether or not to dynamically slow down the data. A decision point 121 determines if the full data bus is available or if half the bus is currently in use. If it is determined that the full bus is available, and a hardware disable switch 122 is set to enable full speed transfers, the data is read out of the buffer and sent across the interface at full speed as indicated at 130.

However, if the determination is that only half the bus is available the hardware will have to trigger a dynamic data slowdown and enable the new request to be "zippered" onto the available half of the bus, interleaving with the ongoing data transfer. Since this interleaving can be selectively disabled, the interface arbitration hardware first must determine the setting of a zipper enable disable switch via a decision point indicated at 140. If the zipper or time shifting function is disabled, the request is rejected and the data transfer is cancelled as indicated at 180. The request 101 will not gain access to the interface at this time. The request 101 for use of the interface must then be retried as indicated at 181. If the zipper function is enabled, a special zipper signal is sent to the buffer dataflow read controls and interface muxing, as indicated at 141, indicating that the read rate should be decreased to one data entry every other cycle. At this point, the logic knows half the bus is available, but since there is a fixed timing between the arrival of the request 101 and the cycle in which the data is read out of the buffer and onto the interface data bus, the request 101 has a fifty percent chance of arriving in a cycle that lines up with the free half of the data bus. The bus arbitration hardware must decide if the request arrival lines up with the free half of the bus as indicated at 150. If it does, no further action is required; the zipper signal 141 will trigger the dataflow to send the data over the interface at half speed as indicated at 170.

If it is determined at step 150 that the arrival of the request 101 does not line up with the free portion of the bus, a one cycle 'skew' is required. The 'skew' involves delaying the first cycle of the response and data bus access for request 101 by one cycle to avoid data collisions between the new request's data and the ongoing data transfer. The timing relationship between the response and the data bus must be maintained, so the response bus must be delayed as well. As long as the skew is enabled as indicated at 151, the response and data will be sent with a one cycle delay as indicated at 161. The bus arbitration logic delays the response bus on its own, and notifies the dataflow buffer read controls and interface multiplexers of the delay by sending a unique 'skew' signal 160 to the dataflow. If however, the 'skew' functionality is disabled for any reason, the request 101 is rejected and the data transfer is cancelled 180. The request 101 will not gain access to the interface at this time. The request 101 for use of the interface must then be retried 181.

Figure 2:
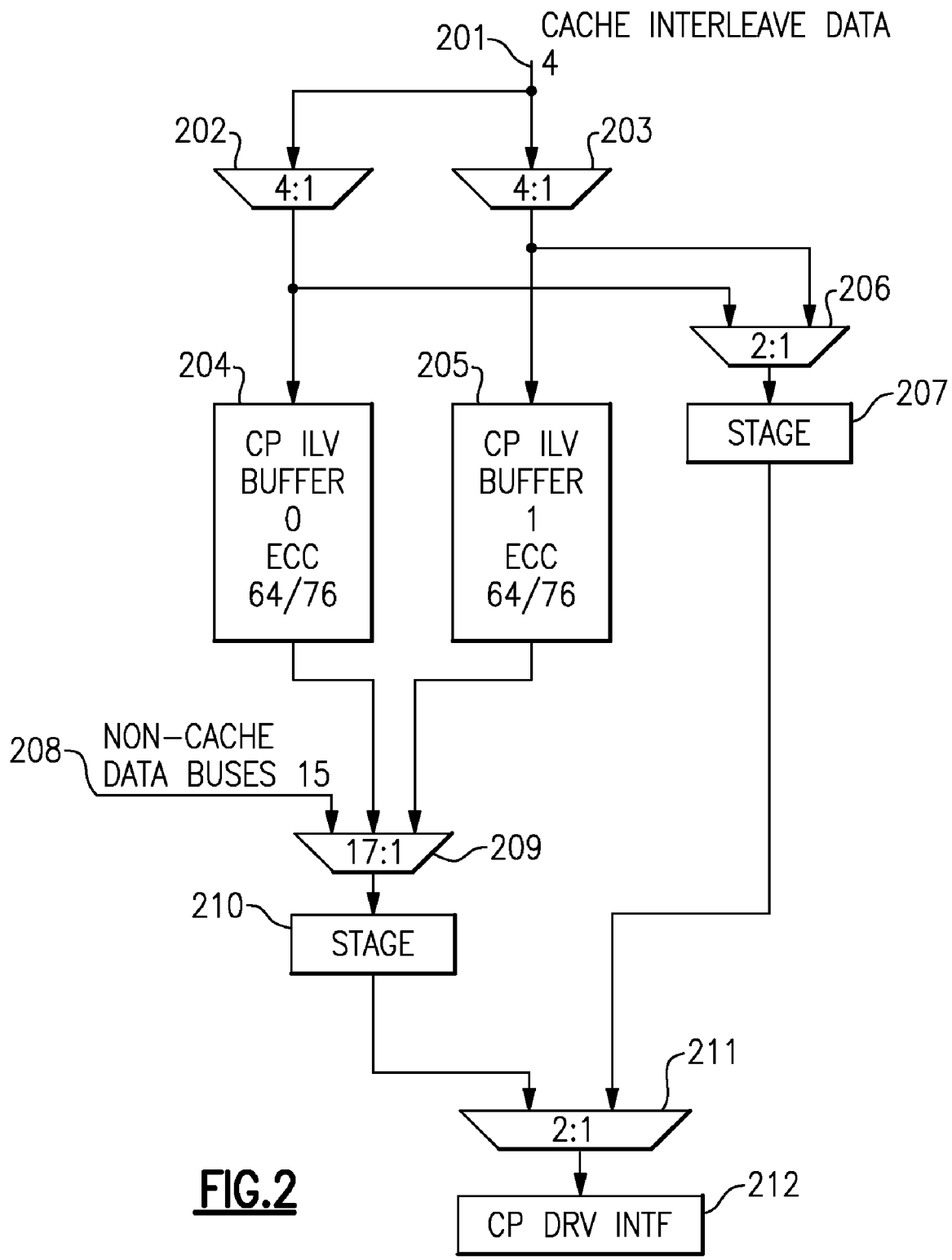
FIG. 2 illustrates the relevant dataflow.

FIG. 2 illustrates a structure to handle the movement of data associated with a performance critical request for data 101. Performance critical data transfers are sourced by the cache interleave buses 201 and destined for one of many chip interfaces 212. The dataflow has the capability to source data from additional locations 208 if necessary.

Due to narrow chip interface data bus wits, data transfers require multiple cycles to complete. In addition, due to varying transfer rates, the control flow logic described previously must decide what rate to transfer the data (full speed or half speed) and whether to skew the data return relative to the request (1 cycle delayed or no delay).

In this embodiment, the cache array is sliced into multiple interleaves and each interleave has a dedicated cache interleave data bus 201. This allows multiple cache army reads to be active simultaneously. A data transfer request may source data from one or more of the cache interleave buses. The access delay of the cache interleaves 201 is fixed relative to the request passing through the pipe. In addition, the data is always supplied at a fixed rate equivalent to the full-speed interface rate. The data flow is able to accommodate the differences in timing and bandwidth between the data source and destination.

Data returns at full speed with no time delay 130 occur when the bus is fully available. For this data transfer type, data moves from the appropriate cache interleave buses 201 to the chip interface 212 through one of the cache interleave multiplexers 202, 203, the bypass multiplexer 206, the bypass staging register 207, and the interface multiplexer 211. All subsequent data shots—the second through the last data shots—follow the same path through the dataflow until the data transfer completes. The data buffer register files 204, 205, which can store an entire data transfer, are bypassed in this case to avoid incurring the write and read access delay associated with these storage elements, thus this path is referred to as the "bypass" data path.

Data returns at half-speed with no time delay 170 occur when the transfer request aligns with an available cycle on the interface and there is already another half-speed transfer in progress. In this scenario, the data flow will return the first cycle of data using the "bypass" data path, which is the same path used by the full speed with no delay return so the first cycle of data is not delayed. All subsequent data, shots—the second through last data shots—are written Into and read out one of the cache interleave (ILV) data buffers 204, 205, to store the cache Interleave data read from the cache arrays at full-speed. Data read out of the ILV buffers passes through a multiplexer 209 and stage 210 before being multiplexed with the "bypass" data 211. The stage 210 at the output of the data buffers 204, 205 is to accommodate the read access delay incurred when reading the storage element.

Data returns at half-speed with a one cycle delay are used to align a new half-speed transfer with an existing half-speed transfer. To align the first data shot to the available interface cycle, the cache interleave data 201 is written into an available ILV buffer 204, 205 and staged 210 before being passed to the chip interface. The ILV buffer is written with the entire data transfer at the full-speed rate, while the buffer is read at the half-speed rate.

There are two parallel data paths 202, 203 and data buffers 204, 205 from the cache interleaves to the chip interface in order to support two half-speed transfers simultaneously. Selection between the two data paths and data buffers is determined by availability. The control flow will prevent collisions between an existing data transfer and a new transfer.

FIGS. 3 and 4 illustrate the timing difference between the scenario where a one cycle skew is not required (FIG. 3) and when it is required (FIG. 4.) Examining FIG. 3 in further detail reveals that the Interface request 302 is presented to the response bus arbiter in the first cycle of the serialization pipeline 301. The response bus arbitration takes place in the following clock cycle 311. In the next cycle 312 the dynamic data rate change decisions take place. During this cycle 312, the response bus arbitrator determines if the request arrived in a cycle that lined up with the free half of the bus, by cross checking with the data bus model for the existing data transfer on the interface 333. It the response lines up correctly and is not canceled for any other reason and these decisions reveal that the data needs to be dynamically slowed down, in the next clock cycle the time shift or 'zipper' signal is sent 313 to the dataflow buffer controller. This signal is sent in cycle C4 of the serialization pipeline 301. The arrival of this signal at the dataflow buffer controller triggers the buffer outgate multiplexer to assert the following cycle 322 and to continue to assert every other cycle for the length of the transfer. In addition the time shift or 'zipper' signal 313 triggers the read address pointer to begin incrementing 321. Because of the slowed data rate, the read address pointer 321 is incremented, then held for one cycle before being incremented again. The first read address pointer increment 323 takes place one cycle after the buffer outgate multiplexer 324 assets for the first time. Multiplexer assert 324 is to outgate the first shot of data from the buffer and onto the interface, which corresponds to buffer address 00. The assertion of 324 is done at his time to allow the first shot of data 335 to be active on the chip to chip interface in two cycles.

The first beat of the two cycle response 331 which always accompanies the data transfer is active on the chip to chip Interface the same cycle the 'zipper' signal 313 is sent to the dataflow controls. The second response beat 332 follows one cycle afterwards. The interface specification requires that the first shot of data 335 follow the second response beat 332 by two cycles. The buffer outgate multiplexer select 322 activation triggers the arrival of the data on the free half of the interface 334 two cycles later.

FIG. 4 shows the timing of the dynamic data reduction scenario when a one cycle skew is required. Examining FIG. 4 in detail reveals that the interface request 402 is presented to the response bus arbiter in the first cycle of the serialization pipeline 401. The response bus arbitration takes place in the following dock cycle 411. In the next cycle 412 the dynamic data rate change decisions take place. During this cycle 412, the response bus arbitrator determines if the request arrived in a cycle that lined up with the free half of the bus, by cross checking with the data bus model for the existing data transfer on the interface 433. If the response is not canceled for any other reason and these decisions reveal that the data needs to be dynamically slowed down, in the next clock cycle the time shift 'zipper' signal is sent 413 to the dataflow buffer controller. If these decisions further reveal that the data needs to be skewed by one cycle to line up with the free portion of the data bus and not collide with the existing half speed transfer on the data bus 433, skewing is necessary. If the skewing is necessary, the 'skew' signal 414 is also sent to the dataflow buffer controller in this cycle. This signal is sent in cycle C4 of the serialization pipeline 401. The arrival of these two signals at the dataflow buffer controller triggers the buffer outgate multiplexer to assert two cycles later 422 and to continue to assert every other cycle for the length of the transfer. The extra cycle delay is introduced to delay the data outgate to line up with the free portion of the bus 434 and not collide with the existing data transfer 433. In addition, the combination of the 'skew' signal 414 and the time shift 'zipper signal' 413 trigger the read address pointer to begin incrementing 421. Because of the slowed data rate, the read address pointer 421 is incremented, then held for one cycle before being incremented again. The first read address pointer increment 423 takes place one cycle after the buffer outgate multiplexer 424 asserts for the first time. This is to outgate the first shot of data from the buffer and onto the interface, which corresponds to buffer address 00. The assertion of the multiplexer 424 is done at this time to allow the first shot of data 435 to be active on the chip to chip interface in two cycles. However, as a result of the 'skew' 414, both the read address increment 423 and the multiplexer outgate select 424, as well as the first shot of date on the interface 435 (and all subsequent data shots 434) are delayed by one cycle.

The first beat of the two cycle response 431 which always accompanies the data transfer is active on the chip to chip interface the cycle after the 'zipper' signal 413 and the 'skew' signal 414 are sent to the dataflow controls. The second response beat 432 follows one cycle after the first response beat. The interface specification requires that the first shot of data 435 follow the second response beat 432 by two cycles. The buffer outgate multiplexer select 422 activation triggers the arrival of the data on the free half of the interface 434 two cycles later. The response arbitration logic remembers that the 'skew' signal 414 was sent to the dataflow and delays the launch of each of the response beats (431, 432) by one cycle.

The capabilities of the present invention can be implemented. In software, firmware, hardware or some combination thereof.

Figure 5:
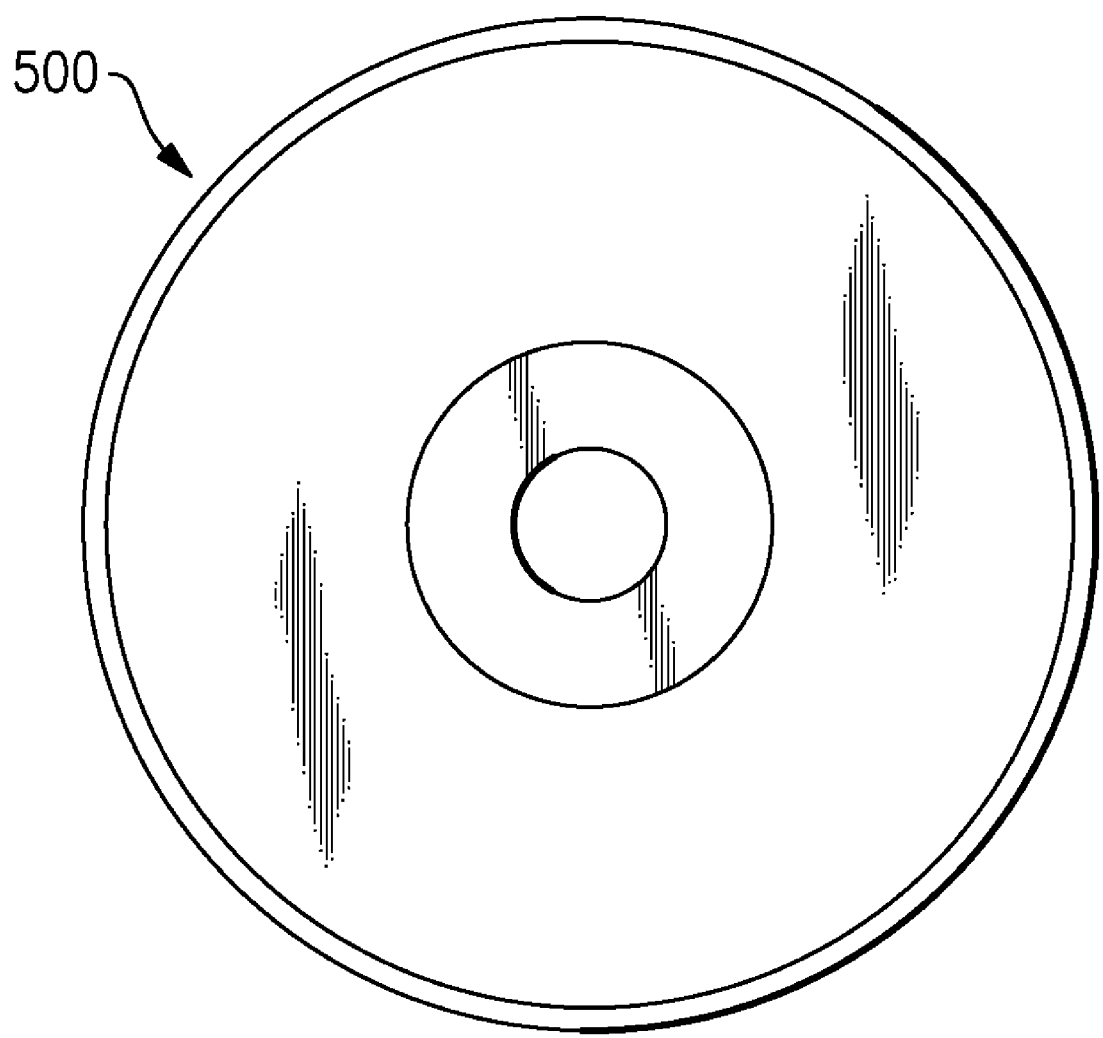
FIG. 5 shows a computer readable medium bearing code which implements this invention.

As one example, one or more aspects of the present invention can be included in an article of manufacture (e.g., one or more computer program products) having, for instance, computer usable media, indicated at 500 in FIG. 5. The media has embodied therein, for instance, computer readable program code means for providing and facilitating the capabilities of the present invention. The article of manufacture can be included as a part of a computer system or sold separately. Machine readable storage mediums may include fixed hard drives, optical discs, magnetic tapes, semiconductor memories such as read only memories (ROMs), programmable memories (PROMs of various types), flash memory, etc. The article containing this computer readable code is utilized by executing the code directly from the storage device, or by copying the code from one storage device to another storage device, or by transmitting the code on a network for remote execution.

The flow diagrams depicted herein are just examples. There nay be many variations to these diagrams or the steps (or operations) described therein without departing from the spirit of the invention. For instance, the steps may be performed in a differing order, or steps may be added, deleted or modified. All of these variations are considered a part of the claimed invention.

In the drawings and specifications there has been set forth a preferred embodiment of the invention and, although specific terms are used, the description thus given uses terminology in a generic and descriptive sense only and not for purposes of limitation.

What is claimed is:

1. Method comprising:
    initiating a request for high speed data transfer over a bus which is enabled to handle both high speed and low speed transfers over available bandwidth at clocked intervals;
    determining the availability and enablement of the bus for high speed transfer in response to the initiation of the request;
    if the bus is available and enabled for high speed transfer, executing the requested transfer;
    if the bus is unavailable due to an existing low speed transfer, determining whether time shifting of the transfer is necessary due to the existing low speed transfer and enabled;
    if time shifting is necessary and enabled, determining whether skewing of the data flow of the requested transfer is necessary;
    if skewing is unnecessary, interleaving the requested transfer with the existing low speed transfer; and
    if skewing is necessary, shifting the clocked interval of the data flow and interleaving the requested transfer with the existing low speed transfer.

2. Method according to claim 1 wherein the determining of whether time shifting is enabled follows the determining of whether the bus is available for high speed transfer.

3. Method according to claim 2 wherein the determining of whether the bus is enabled for high speed transfer follows the determining of whether the bus is available for high speed transfer.

4. Method according to claim 1 wherein the determining of whether time shifting is necessary follows the determining of whether the bus is enabled for high speed transfer.

5. Method according to claim 1 wherein the determining of whether time shifting is enabled follows the determining of whether time shifting is necessary.

6. Method according to claim 1 wherein the initiating of a request is of a transfer significant for system performance.

7. Method according to claim 1 wherein the determining of bus availability is preceded by determining whether an interface for data transfer to the bus is available.

8. Apparatus comprising:
    a computer system having a shared interface for transfer of data between two elements of said system;

logic elements which initiate a request for high speed data transfer through the interface over a bus which is enabled to handle both high and low speed transfers and is available for transfers at high and low speed when free of competing transfers;

logic elements which determine the availability and enablement of the bus for high speed transfer in response to the initiation of the request;

logic elements which execute the requested transfer if the bus is available and enabled for high speed transfer;

logic elements which determine whether time shifting of the transfer is necessary due to the existing low speed transfer and available if the bus is unavailable due to an existing low speed transfer;

logic elements which determine whether skewing of the data flow of the requested transfer is necessary if time shifting is necessary and enabled;

logic elements which determine that the requested transfer may be interleaved with the existing low speed transfer if skewing is unnecessary and execute the requested transfer; and logic elements which skew the data flow of the requested transfer and interleave the requested transfer with the existing low speed transfer if skewing is determined to be necessary and enabled and execute the requested transfer.

9. Apparatus according to claim 8 wherein the determining of whether time shifting is enabled follows the determining of whether the bus is available for high speed transfer.

10. Apparatus according to claim 9 wherein the determining of whether the bus is enabled for full speed transfer follows the determining of whether the bus is available for high speed transfer.

11. Apparatus according to claim 8 wherein the determining of whether time shifting is necessary follows the determining of whether the bus is enabled for high speed transfer.

12. Apparatus according to claim 8 wherein the determining of whether time shifting is enabled follows the determining of whether time shifting is necessary.

13. Apparatus according to claim 8 wherein the initiating of a request is of a transfer significant for system performance.

14. Apparatus according to claim 8 wherein the determining of bus availability is preceded by determining whether an interface for data transfer to the bus is available.

15. Method comprising:

producing computer executable program code;

storing the produced executable program code on tangible computer readable media;

deploying the stored program code from the media to a computer system to be executed thereon, the program code comprising instruction modules which, when executing, initiate a request for high speed data transfer over a bus which which is enabled to handle both high and low speed transfers over available bandwisth;

determine the availability and enablement of the bus for high speed transfer in response to the initiation of the request;

execute the requested transfer if the bus is available and enabled for high speed transfer;

determine whether time shifting of the transfer is necessary due to an existing low speed transfer and available if the bus is unavailable due to the existing low speed transfer, interleave the requested transfer with the existing low speed transfer if skewing is unnecessary; and skew the data flow of the requested transfer and interleave the requested transfer with the existing low speed transfer if skewing is necessary and enabled.

16. Method according to claim 15 wherein the determining of whether time shifting is enabled follows the determining of whether the bus is available for high speed transfer.

17. Method according to claim 16 wherein the determining of whether the bus is enabled for full speed transferfollows the determining of whether the bus is available for high speed transfer.

18. Method according to claim 15 wherein the determining of whether time shifting is necessary follows the determining of whether the bus is enabled for high speed transfer.

19. Method according to claim 15 wherein the determining of whether time shifting is enabled follows the determining of whether time shifting is necessary.

20. Method according to claim 15 wherein the initiating of a request is of a transfer significant for system performance.

* * * * *